(12) United States Patent
Kurasawa

(10) Patent No.: US 12,277,699 B2
(45) Date of Patent: Apr. 15, 2025

(54) METHOD FOR DETERMINING QUALITY OF INSPECTION DATA USING MACHINE LEARNING MODEL, INFORMATION PROCESSING APPARATUS, AND NON-TRANSITORY COMPUTER READABLE STORAGE MEDIUM STORING COMPUTER PROGRAM

(71) Applicant: SEIKO EPSON CORPORATION, Tokyo (JP)

(72) Inventor: Hikaru Kurasawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 390 days.

(21) Appl. No.: 17/809,749

(22) Filed: Jun. 29, 2022

(65) Prior Publication Data

US 2023/0005119 A1    Jan. 5, 2023

(51) Int. Cl.
*G06T 7/00* (2017.01)
*G06V 10/74* (2022.01)
*G06V 10/764* (2022.01)
*G06V 10/776* (2022.01)
(Continued)

(52) U.S. Cl.
CPC ............ *G06T 7/001* (2013.01); *G06V 10/761* (2022.01); *G06V 10/764* (2022.01); *G06V 10/776* (2022.01); *G06V 10/82* (2022.01); *G06V 20/70* (2022.01); *G06T 2207/20081* (2013.01);
(Continued)

(58) Field of Classification Search
CPC ........... G06T 7/001; G06T 2207/20081; G06T 2207/20084; G06T 2207/30108; G06T 2207/30168; G06T 2207/20021; G06T 7/0004; G06V 10/761; G06V 10/764; G06V 10/776; G06V 10/82; G06V 20/70; G06V 10/478; G06V 2201/06
See application file for complete search history.

(56) References Cited

U.S. PATENT DOCUMENTS

2022/0164577 A1* 5/2022 Kurasawa .............. G06V 10/40
2022/0245450 A1* 8/2022 Nishimura ............. G06N 3/045

FOREIGN PATENT DOCUMENTS

JP      2021042994 A     3/2021
JP      2021144314 A  *  9/2021

OTHER PUBLICATIONS

JP 2021144314 (Year: 2021).*

* cited by examiner

*Primary Examiner* — Hwa Andrew Lee
(74) *Attorney, Agent, or Firm* — CHIP LAW GROUP

(57) ABSTRACT

A quality determination method includes: (a) generating a plurality of pieces of training data by classifying a plurality of pieces of non-defective product data into a plurality of classes; (b) executing learning of a machine learning model using the plurality of pieces of training data; (c) preparing a known feature spectrum group; and (d) executing quality determination processing of inspection data using the machine learning model and the known feature spectrum group. The (d) includes (d1) calculating a feature spectrum related to the inspection data, (d2) calculating a similarity between the feature spectrum and the known feature spectrum group, and (d3) determining the inspection data to be non-defective when the similarity is equal to or greater than a threshold value and determining the inspection data to be defective when the similarity is less than the threshold value.

10 Claims, 11 Drawing Sheets

(51) Int. Cl.
*G06V 10/82* (2022.01)
*G06V 20/70* (2022.01)
(52) U.S. Cl.
CPC ............... *G06T 2207/20084* (2013.01); *G06T 2207/30108* (2013.01); *G06T 2207/30168* (2013.01)

FIG. 4
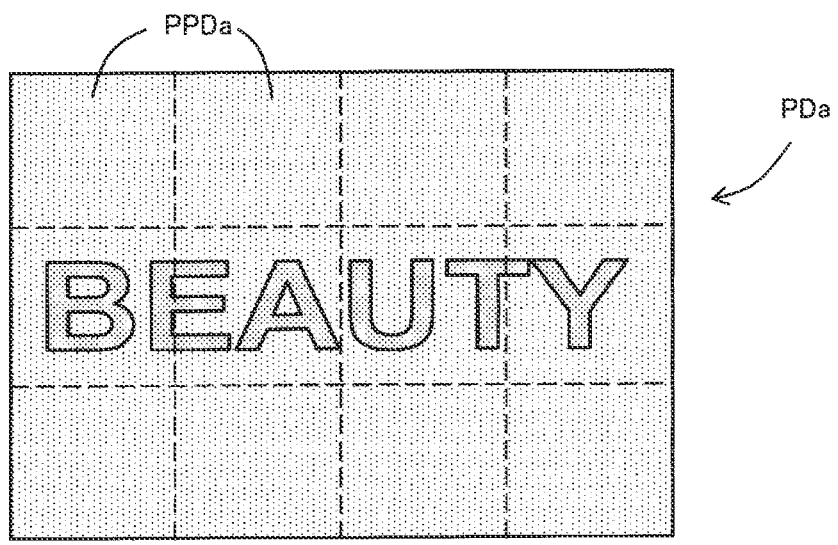
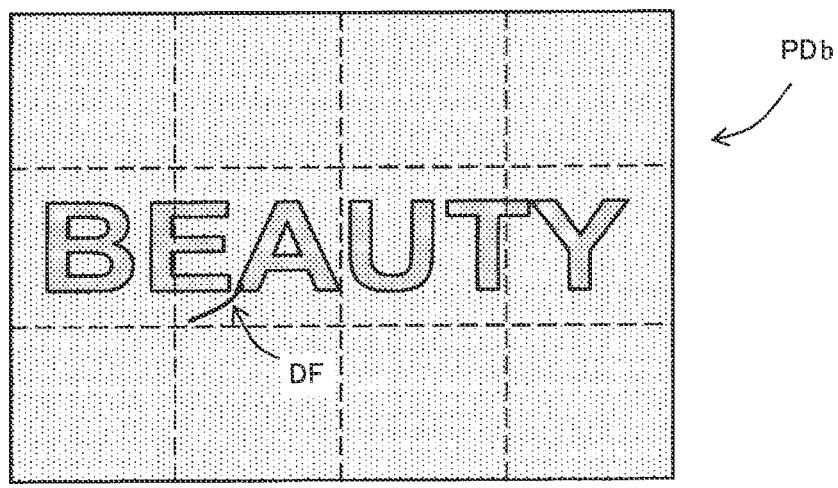

FIG. 7

KSp_ConvVN1

| CLASS i | SPECIFIC LAYER j | PARTIAL REGION k | DATA NUMBER q | KNOWN FEATURE SPECTRUM Sp |
|---|---|---|---|---|
| 1 | 1 | 1 | 1 | ................................. |
| ... | ... | ... | ... | ................................. |
| 1 | 1 | 1 | max1 | ................................. |
| ... | ... | ... | ... | ................................. |
| 1 | 1 | 36 | 1 | ................................. |
| ... | ... | ... | ... | ................................. |
| 1 | 1 | 36 | max1 | ................................. |
| 2 | 1 | 1 | 1 | ................................. |
| ... | ... | ... | ... | ................................. |
| 2 | 1 | 1 | max2 | ................................. |
| ... | ... | ... | ... | ................................. |
| 2 | 1 | 36 | 1 | ................................. |
| ... | ... | ... | ... | ................................. |
| 2 | 1 | 36 | max2 | ................................. |

$i=1$
$j=1$
$k=1\sim36$ $i=2$
$j=1$
$k=1\sim36$ $j=1$: ConvVN1
$j=2$: ConvVN2
$j=3$: ClassVN

FIG. 11

<SECOND CALCULATION METHOD M2>

LOCAL SIMILARITY S(i,j,k)

| SPECIFIC LAYER: j | | j=1: ConvVN1 | | | | | |
|---|---|---|---|---|---|---|---|
| PARTIAL REGION: k | | 1 | 2 | 3 | 4 | 5 | 6 |
| CLASS: i | 1 | 0.80 | 0.66 | 0.90 | 0.85 | 0.91 | 0.90 |
| | 2 | 0.90 | 0.72 | 0.70 | 0.90 | 0.89 | 0.90 |

S(i,j,k)=max{G(Sp(j,k), KSp(i,j,k,q=all)} max →

CLASS SIMILARITY Sclass (i, j=1)

| SPECIFIC LAYER: j | | j=1: ConvVN1 |
|---|---|---|
| CLASS: i | 1 | 0.91 |
| | 2 | 0.90 | ave. →

CLASS SIMILARITY Sclass (i, j=1)

| SPECIFIC LAYER: j | | j=1: ConvVN1 |
|---|---|---|
| CLASS: i | 1 | 0.84 |
| | 2 | 0.84 | min →

CLASS SIMILARITY Sclass (i, j=1)

| SPECIFIC LAYER: j | | j=1: ConvVN1 |
|---|---|---|
| CLASS: i | 1 | 0.66 |
| | 2 | 0.70 |

FIG. 12

<THIRD CALCULATION METHOD M3>

CLASS SIMILARITY Sclass (i, j=1)

| SPECIFIC LAYER: j | j=1 : ConvVN1 | |
|---|---|---|
| CLASS: i | 1 | 0.80 |
| | 2 | 0.90 |

Sclass(i,j)=max[G{Sp(j,k=all), KSp(i,j,k=all,q=all)}]

METHOD FOR DETERMINING QUALITY OF INSPECTION DATA USING MACHINE LEARNING MODEL, INFORMATION PROCESSING APPARATUS, AND NON-TRANSITORY COMPUTER READABLE STORAGE MEDIUM STORING COMPUTER PROGRAM

The present application is based on, and claims priority from JP Application Serial Number 2021-108801, filed Jun. 30, 2021, the disclosure of which is hereby incorporated by reference herein in its entirety.

BACKGROUND

1. Technical Field

The present disclosure relates to a method for determining the quality of inspection data using a machine learning model, an information processing apparatus, and a computer program.

2. Related Art

JP-A-2021-42994 discloses an appearance inspection system that determines the quality of a product based on an image thereof. In the appearance inspection system, quality determination is executed using a learning model generated by an autoencoder. In the learning model using the autoencoder, the learning can be executed using only data of a non-defective product. For example, when the learning of the autoencoder is executed using only image data of the non-defective product and image data to be inspected is decoded by the learned autoencoder, image data to be output close to the learned image data of the non-defective product is obtained. At this time, when the difference between the image data to be inspected and the image data to be output is large, the inspection data can be determined to be defective.

However, in the learning model using the autoencoder, unless the processing of compression in an encoding unit is appropriately set, it may not be possible to distinguish whether the difference between the image data to be inspected and the image data to be output is due to a defect or due to inappropriate compression processing. Therefore, a technique of improving the determination accuracy of the quality determination using a machine learning model other than the autoencoder is desired.

SUMMARY

A first aspect of the present disclosure provides a method for determining quality of inspection data using a machine learning model of a vector neural network type including a plurality of vector neuron layers. This method includes: (a) generating a plurality of pieces of training data by classifying a plurality of pieces of data of a non-defective product into a plurality of classes and assigning a plurality of labels distinguishing the plurality of classes to the plurality of pieces of data of the non-defective product; (b) executing learning of the machine learning model using the plurality of pieces of training data; (c) preparing a known feature spectrum group obtained based on an output of at least one specific layer among the plurality of vector neuron layers when the plurality of pieces of training data are input to the learned machine learning model; and (d) executing quality determination processing of the inspection data using the learned machine learning model and the known feature spectrum group. The (d) includes (d1) calculating a feature spectrum based on the output of the specific layer in response to an input of the inspection data to the machine learning model, (d2) calculating a similarity between the feature spectrum and the known feature spectrum group, and (d3) determining the inspection data to be non-defective when the similarity is equal to or greater than a preset threshold value, and determining the inspection data to be defective when the similarity is less than the threshold value.

A second aspect of the present disclosure provides an information processing apparatus configured to execute quality determination processing for determining quality of inspection data using a machine learning model of a vector neural network type including a plurality of vector neuron layers. The information processing apparatus includes a memory configured to store the machine learning model, and a processor configured to execute a calculation using the machine learning model. The processor is configured to (a) generate a plurality of pieces of training data by classifying a plurality of pieces of data of a non-defective product into a plurality of classes and assigning a plurality of labels distinguishing the plurality of classes to the plurality of pieces of data of the non-defective product, (b) execute learning of the machine learning model using the plurality of pieces of training data, (c) prepare a known feature spectrum group obtained based on an output of at least one specific layer among the plurality of vector neuron layers when the plurality of pieces of training data are input to the learned machine learning model, and (d) execute quality determination processing of the inspection data using the learned machine learning model and the known feature spectrum group. The (d) includes (d1) calculating a feature spectrum based on the output of the specific layer in response to an input of the inspection data to the machine learning model, (d2) calculating a similarity between the feature spectrum and the known feature spectrum group, and (d3) determining the inspection data to be non-defective when the similarity is equal to or greater than a preset threshold value, and determining the inspection data to be defective when the similarity is less than the threshold value.

A third aspect of the present disclosure provides a non-transitory computer readable storage medium storing a computer program configured to execute, by a processor, quality determination processing for determining quality of inspection data using a machine learning model of a vector neural network type including a plurality of vector neuron layers. The computer program includes: (a) generating a plurality of pieces of training data by classifying a plurality of pieces of data of a non-defective product into a plurality of classes and assigning a plurality of labels distinguishing the plurality of classes to the plurality of pieces of data of the non-defective product; (b) processing of executing learning of the machine learning model using the plurality of pieces of training data; (c) preparing a known feature spectrum group obtained based on an output of at least one specific layer among the plurality of vector neuron layers when the plurality of pieces of training data are input to the learned machine learning model; and (d) executing quality determination processing of the inspection data using the learned machine learning model and the known feature spectrum group. The (d) includes (d1) calculating a feature spectrum based on the output of the specific layer in response to an input of the inspection data to the machine learning model, (d2) calculating a similarity between the feature spectrum and the known feature spectrum group, and (d3) determining the inspection data to be non-defective when the similarity is equal to or greater than a preset threshold value, and determining the inspection data to be defective when the similarity is less than the threshold value.

BRIEF DESCRIPTION OF THE DRAWINGS

FIG. 4 is a schematic diagram showing an example of a product to be inspected.

FIG. 7 is a schematic diagram showing a configuration of a known feature spectrum group.

FIG. 11 is a schematic diagram showing a second calculation method of the class similarity.

FIG. 12 is a schematic diagram showing a third calculation method of the class similarity.

DESCRIPTION OF EXEMPLARY EMBODIMENTS

A. Embodiment

Figure 1:
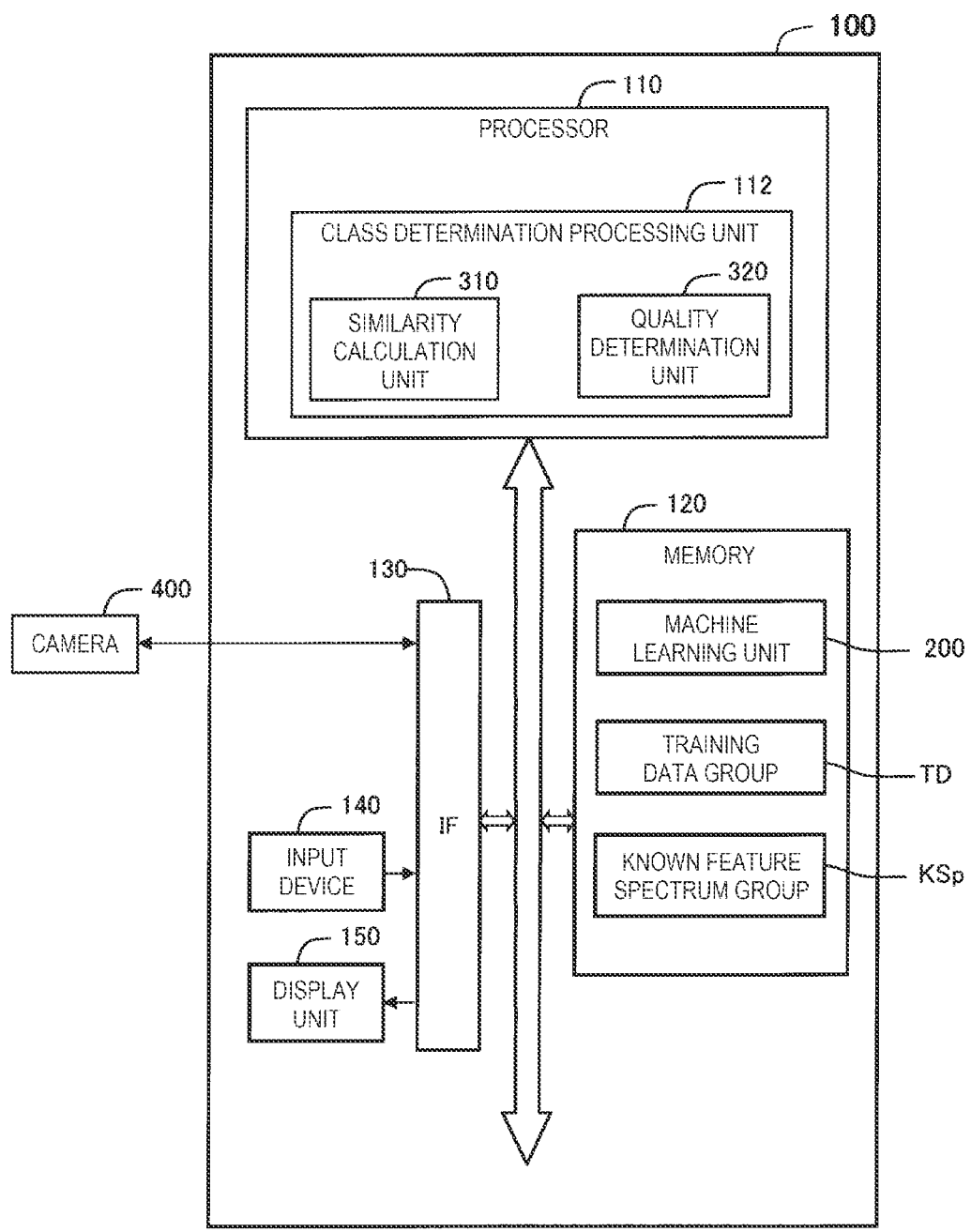
FIG. 1 is a block diagram of a quality determination system.

FIG. 1 is a block diagram showing a quality determination system according to an embodiment. The quality determination system includes an information processing apparatus 100 and a camera 400. The camera 400 is for capturing an image of a product to be inspected. As the camera 400, a camera that captures a color image may be used, or a camera that captures a monochrome image or a spectral image may be used. In the present embodiment, an image captured by the camera 400 is used as training data or inspection data, and data other than the image may be used as training data or inspection data. In this case, an inspection data acquisition apparatus corresponding to the type of data is used instead of the camera 400.

The information processing apparatus 100 includes a processor 110, a memory 120, an interface circuit 130, and an input device 140 and a display unit 150 that are coupled to the interface circuit 130. The camera 400 is also coupled to the interface circuit 130. Although not limited, for example, the processor 110 has not only a function of executing processing described in detail below but also a function of displaying, on the display unit 150, data obtained by the processing and data generated during the processing.

The processor 110 functions as a class determination processing unit 112 that executes class determination processing of the inspection data. The class determination processing unit 112 includes a similarity calculation unit 310 and a quality determination unit 320. The class determination processing unit 112 is implemented by executing a computer program stored in the memory 120 by the processor 110. Alternatively, the class determination processing unit 112 may be implemented by a hardware circuit. The term "processor" in the present description includes such a hardware circuit. The processor that executes the class determination processing may be a processor included in a remote computer that is connected to the information processing apparatus 100 via a network.

A machine learning model 200, a training data group TD, and a known feature spectrum group KSp are stored in the memory 120. The machine learning model 200 is used for processing by the class determination processing unit 112. A configuration example and an operation of the machine learning model 200 will be described later. The training data group TD is a set of labeled data used for learning of the machine learning model 200. In the present embodiment, the training data group TD is a set of image data. The known feature spectrum group KSp is a set of feature spectra obtained when the training data group TD is input to the learned machine learning model 200. The feature spectrum will be described later.

Figure 2:
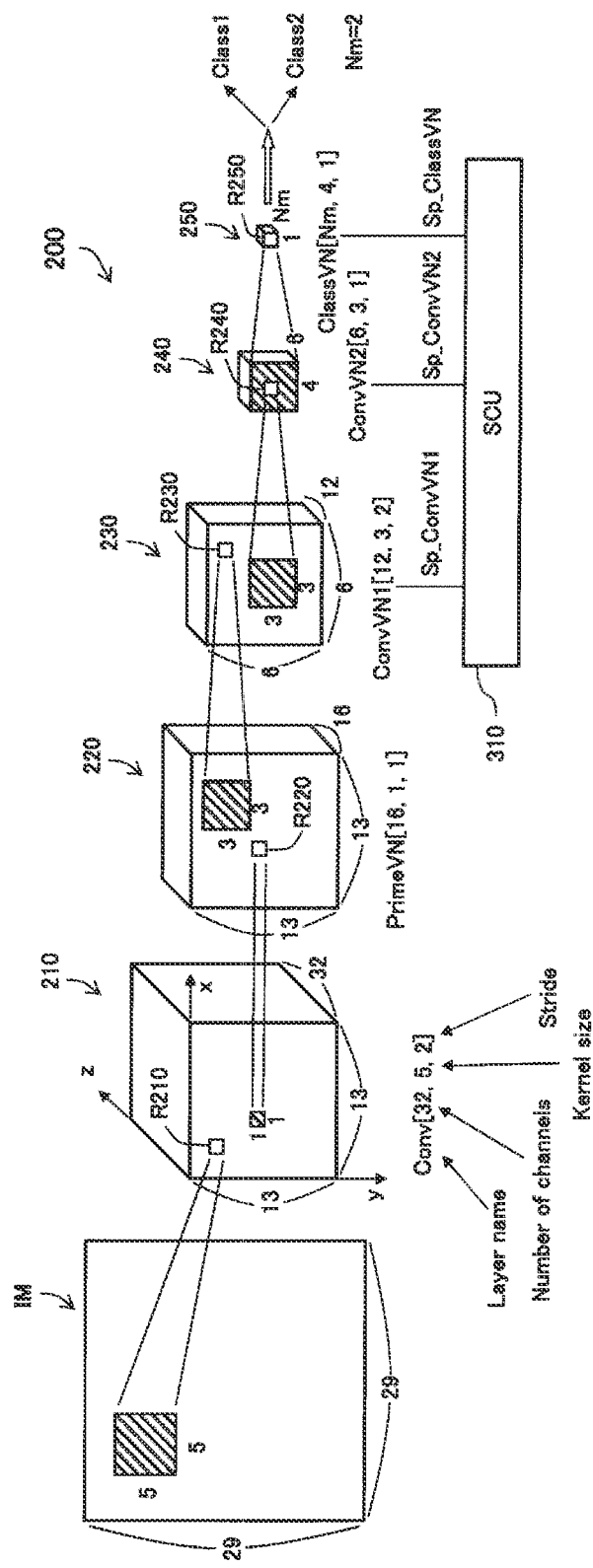
FIG. 2 is a schematic diagram showing a configuration example of a machine learning model.

FIG. 2 is a schematic diagram showing a configuration example of the machine learning model 200. The machine learning model 200 includes, in order from an input data IM side, a convolutional layer 210, a prime vector neuron layer 220, a first convolutional vector neuron layer 230, a second convolutional vector neuron layer 240, and a classification vector neuron layer 250. Among these five layers 210 to 250, the convolutional layer 210 is the lowest layer, and the classification vector neuron layer 250 is the highest layer. In the following descriptions, the layers 210 to 250 are also referred to as a "Conn layer 210", a "PrimeVN layer 220", a "ConvVN1 layer 230", a "ConvVN2 layer 240", and a "ClassVN layer 250", respectively.

The convolutional vector neuron layers 230 and 240 are used in the example in FIG. 2. Alternatively, the number of convolutional vector neuron layers may be any number, and the convolutional vector neuron layer may be omitted. It is preferable to use one or more convolutional vector neuron layers.

Configurations of the layers 210 to 250 in FIG. 2 can be described as follows.

Description of Configurations of Machine Learning Model 200

Conv layer 210: Conv[32, 5, 2]
    PrimeVN layer 220: PrimeVN [16, 1, 1]
    ConvVN1 layer 230: ConvVN1 [12, 3, 2]
    ConvVN2 layer 240: ConvVN2 [6, 3, 1]
    ClassVN layer 250: ClassVN [Nm, 4, 1]
    Vector Dimension VD: VD=16

In the descriptions of the layers 210 to 250, character strings before parentheses are layer names, and numbers in the parentheses are the number of channels, surface sizes of kernels, and strides in order. For example, the layer name of the Conv layer 210 is "Cony", the number of channels is 32, the surface size of a kernel is 5×5, and the stride is 2. In FIG. 2, these descriptions are shown below the layers. A hatched rectangle drawn in each layer represents the surface size of the kernel used when an output vector of an adjacent upper layer is calculated. In the present embodiment, since the input data IM is image data, the surface size of the kernel is also two-dimensional. Values of parameters used in the descriptions of the layers 210 to 250 are examples, and can be changed to any value.

The Conv layer 210 is a layer including scalar neurons. The other four layers 220 to 250 are layers including vector neurons. The vector neuron is a neuron in which a vector is used as an input or an output. In the above descriptions, the dimension of the output vector of each vector neuron is constant at 16. Hereinafter, a term "node" is used as a superordinate concept of the scalar neuron and the vector neuron.

In FIG. 2, regarding the Conv layer 210, a first axis x and a second axis y that define plane coordinates of node arrays, and a third axis z that represents a depth are shown. FIG. 2 shows that the sizes of the Conv layer 210 in x, y, and z directions are 13, 13, and 32. The size in the x direction and the size in the y direction are referred to as "resolution". The size in the z direction is the number of channels. These three axes x, y, and z are also used as coordinate axes that indicate the positions of the nodes in the other layers. However, in FIG. 2, the axes x, y, and z are not shown in the layers other than the Conv layer 210.

As is well known, a resolution W1 after convolution is obtained by the following equation.

$$W1 = \mathrm{Ceil}\{(W0-Wk+1)/S\} \qquad (1)$$

Here, W0 is the resolution before convolution, Wk is the surface size of the kernel, S is the stride, and $\mathrm{Ceil}\{X\}$ is a function for executing an operation of rounding up the decimal part of X.

The resolution of each layer shown in FIG. 2 is an example when the resolution of the input data IM is 29, and the actual resolution of each layer is appropriately changed according to the size of the input data IM.

The ClassVN layer 250 has Nm channels. In the example in FIG. 2, Nm=2. In general, Nm is an integer of 2 or more, and is the number of classes that can be determined using the machine learning model 200. The number Nm of classes that can be determined can be set to a different value for each machine learning model 200. Determination values Class 1 and Class 2 corresponding to two classes are output from two channels of the ClassVN layer 250. In general, the class having the largest value among the determination values Class 1 and Class 2 is used as a class determination result of the input data IM. When the largest value in the determination values Class 1 and Class 2 is less than a predetermined threshold value, it can also be determined that the class of the input data IM is unknown.

In the present disclosure, as will be described later, instead of using the determination values Class 1 and Class 2 of the ClassVN layer 250 that is the output layer, a method for determining whether the input data is known or unknown using the similarity calculated based on the output of a specific vector neuron layer is used.

In FIG. 2, partial regions Rn in the layers 210, 220, 230, 240, and 250 are further depicted. The subscript "n" of each partial region Rn is the numeral number of each layer. For example, a partial region R210 indicates a partial region in the Conv layer 210. The "partial region Rn" is a region that is specified by a plane position (x, y) defined by the position of the first axis x and the position of the second axis y in each layer and includes a plurality of channels along the third axis z. Each partial region Rn has dimensions of "Width"×"Height"×"Depth" corresponding to the first axis x, the second axis y, and the third axis z. In the present embodiment, the number of nodes included in one "partial region Rn" is "1×1×depth number", that is, "1×1×number of channels".

As shown in FIG. 2, a feature spectrum Sp_ConvVN1 to be described later is calculated based on an output of the ConvVN1 layer 230, and is input to the similarity calculation unit 310. Similarly, feature spectra Sp_ConvVN2 and Sp_ClassVN are calculated based on outputs of the ConvVN2 layer 240 and the ClassVN layer 250, respectively, and are input to the similarity calculation unit 310.

The similarity calculation unit 310 calculates a similarity between the feature spectra Sp_ConvVN1, Sp_ConvVN, and Sp_ClassVN and the known feature spectrum group KSp generated in advance.

In the present disclosure, the vector neuron layer used to calculate the similarity is also referred to as a "specific layer". As the specific layer, any number of one or more vector neuron layers can be used. The configuration of the feature spectrum and the method for calculating the similarity using the feature spectrum will be described later.

Figure 3:
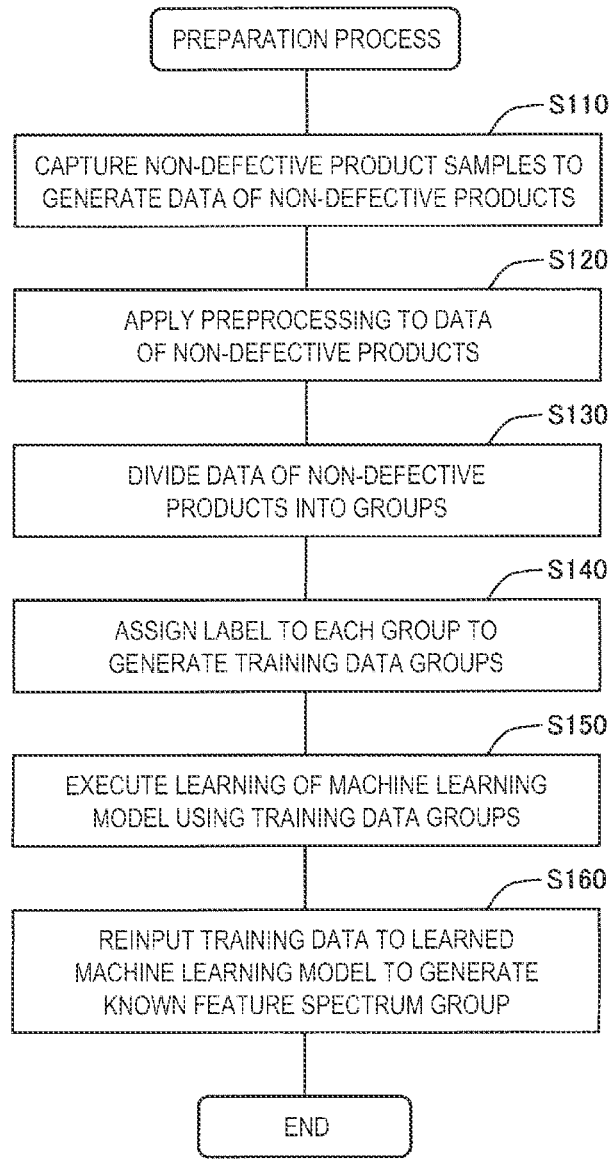
FIG. 3 is a flowchart showing a preparation process of the machine learning model.

FIG. 3 is a flowchart showing a processing procedure of a preparation process of a machine learning model. In step S110, a plurality of pieces of data of non-defective products are generated by capturing a plurality of non-defective product samples.

FIG. 4 is a schematic diagram showing an example of a product to be inspected. Here, examples of a non-defective product PDa and a defective product PDb are shown. The defective product PDb has a flaw DF that is not present in the non-defective product PDa. Each of the non-defective product samples captured in step S110 is a product having no defect such as the flaw DF.

In step S120, preprocessing is applied to the data of the non-defective products. As the preprocessing, for example, processing such as size adjustment and data normalization (min-max normalization) can be executed. FIG. 4 shows an example in which, as the size adjustment, the image of the non-defective product PDa is divided into a plurality of patch images PPDa by division lines indicated by broken lines. Each of the patch images PPDa is used as the data of the non-defective product. Alternatively, the preprocessing may be omitted. In step S130, the class determination processing unit 112 executes processing of dividing the plurality of pieces of data of the non-defective products into a plurality of groups.

Figure 5:
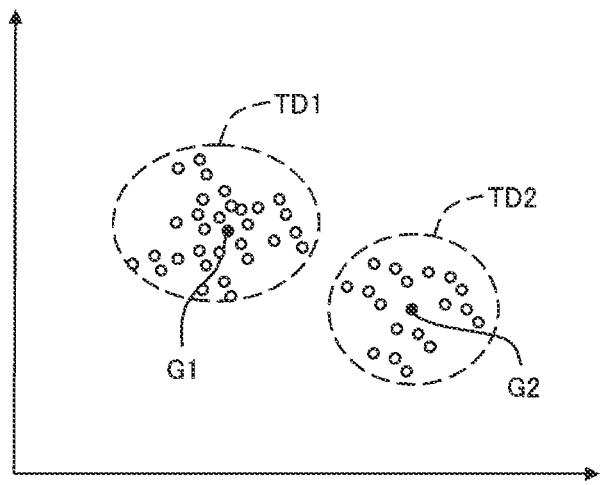
FIG. 5 is a schematic diagram showing training data subjected to clustering processing.

FIG. 5 shows the grouped data of the non-defective products. In this example, the plurality of pieces of data of the non-defective products are grouped, by clustering processing, into a first group TD1 of the data of the non-defective products and a second group TD2 of the data of the non-defective products. In the clustering processing, for example, image data that is the data of the non-defective products is converted into grayscale data, two-dimensional data is converted into one-dimensional data by raster-scanning and arranging luminance from an upper left pixel, and the one-dimensional data is classified into a plurality of groups by the k-mean method. Alternatively, a method may be used in which image data is converted into one-dimensional data, the dimension is reduced by applying principal component analysis (PCA), and the one-dimensional data is classified into a plurality of groups by the k-mean method. In the example in FIG. 5, the one-dimensional data is classified into two groups TD1 and TD2 centered on centers of gravities G1 and G2, respectively. Grouping may be executed using a method other than the k-means method. For example, the data of the non-defective products may be arranged and classified into a plurality of groups according to ordinal numbers thereof.

In step S140 in FIG. 3, a label is assigned to each group to generate a plurality of training data groups. In the present embodiment, labels "1" and "2" are assigned to two groups of the data of the non-defective products, respectively, to generate two training data groups. These labels correspond to the two classes Class 1 and Class 2 of the machine learning model 200 shown in FIG. 2. In the present disclosure, "label" and "class" mean the same.

In step S150, the class determination processing unit 112 executes the learning of the machine learning model 200 using the plurality of training data groups. When the learning using the plurality of training data groups is completed, the learned machine learning model 200 is stored in the memory 120.

In step S160, a plurality of pieces of training data are reinput to the learned machine learning model 200 to generate the known feature spectrum group KSp. The known feature spectrum group KSp is a set of feature spectra to be described below.

Figure 6:
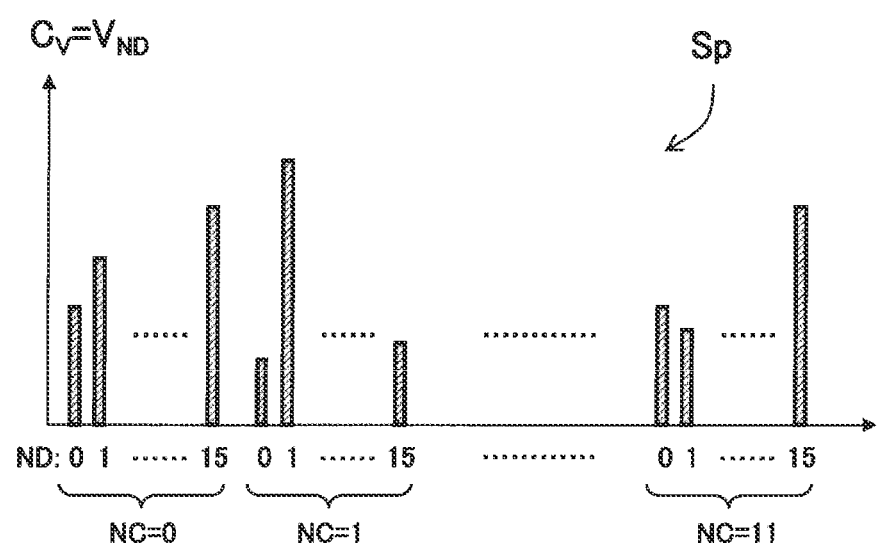
FIG. 6 is a schematic diagram showing a feature spectrum.

FIG. 6 is a schematic diagram showing the feature spectrum Sp obtained by inputting any input data to the learned machine learning model 200. Here, the feature spectrum Sp obtained based on the output of the ConvVN1 layer 230 will be described. A horizontal axis in FIG. 6 indicates positions of vector elements related to output vectors of a plurality of nodes included in one partial region R230 of the ConvVN1 layer 230. The position of the vector element is represented by a combination of an element number ND of the output vector at each node and a channel number NC. In the present embodiment, since the vector dimension is 16 (the number of elements of the output vector output by each node), the element number ND of the output vector is 16 from 0 to 15. Since the number of channels of the ConvVN1 layer 230 is 12, the channel number NC is 12 from 0 to 11. In other words, the feature spectrum Sp is obtained by arranging a plurality of element values of an output vector of each vector neuron included in one partial region R230 over a plurality of channels along the third axis z.

A vertical axis in FIG. 6 indicates a feature value $C_V$ at each spectral position. In this example, the feature value $C_V$ is a value $V_{ND}$ of each element of the output vector. The feature value $C_V$ may be subjected to statistical processing such as centering to an average value 0. As the feature value $C_V$, a value obtained by multiplying the value $V_{ND}$ of each element of the output vector by a normalization coefficient to be described later may be used, or the normalization coefficient may be used as it is. In the latter case, the number of feature values $C_V$ included in the feature spectrum Sp is equal to the number of channels and is 12. The normalization coefficient is a value corresponding to a vector length of the output vector of the node.

Since the number of feature spectra Sp obtained based on the output of the ConvVN1 layer 230 for one piece of input data is equal to the number of planar positions (x, y) of the ConvVN1 layer 230, that is, the number of partial regions R230, the number is 36. Similarly, for one piece of input data, 16 feature spectra Sp are obtained based on the output of the ConvVN2 layer 240, and one feature spectrum Sp is obtained based on the output of the ClassVN layer 250.

When the training data is reinput to the learned machine learning model 200, the similarity calculation unit 310 calculates the feature spectrum Sp shown in FIG. 6 and registers the feature spectrum Sp as the known feature spectrum group KSp in the memory 120.

FIG. 7 is a schematic diagram showing a configuration of the known feature spectrum group KSp. In this example, a known feature spectrum group KSp_ConvVN1 obtained based on the output of the ConvVN1 layer 230 of the machine learning model 200 is shown. A known feature spectrum group KSp_ConvVN2 obtained based on the output of the ConvVN2 layer 240 and a known feature spectrum group KSp_ConvVN1 obtained based on the output of the ClassVN layer 250 also have the same configuration, and are not shown in FIG. 7. As the known feature spectrum group KSp, one obtained based on an output of at least one vector neuron layer may be registered.

Each record of the known feature spectrum group KSp_ConvVN1 includes a parameter i indicating the order of labels or classes, a parameter j indicating the order of specific layers, a parameter k indicating the order of partial regions Rn, a parameter q indicating a data number, and the known feature spectrum KSp. The known feature spectrum KSp is the same as the feature spectrum Sp in FIG. 6.

The parameter i of the class takes the same value of 1 and 2 as the label. The parameter j of the specific layer takes values of 1 to 3 indicating which of the three specific layers 230, 240, and 250 is. The parameter k of the partial region Rn takes a value indicating which of the plurality of partial regions Rn included in the specific layers is, that is, which of the planar positions (x, y) is. For the ConvVN1 layer 230, since the number of partial regions R230 is 36, k=1 to 36. The parameter q of the data number indicates the number of the training data to which the same label is assigned, and takes a value of 1 to max1 for class 1 and a value of 1 to max2 for class 2. The known feature spectrum group KSp does not need to be classified into classes. That is, the known feature spectrum group KSp may include known feature spectra for all classes without distinguishing the plurality of classes.

The plurality of pieces of training data TD used in step S160 are not necessarily the same as the plurality of pieces of training data used in step S150. However, also in step S160, if a part or all of the plurality of pieces of training data used in step S150 are used, there is an advantage in that it is not necessary to prepare additional training data.

Figure 8:
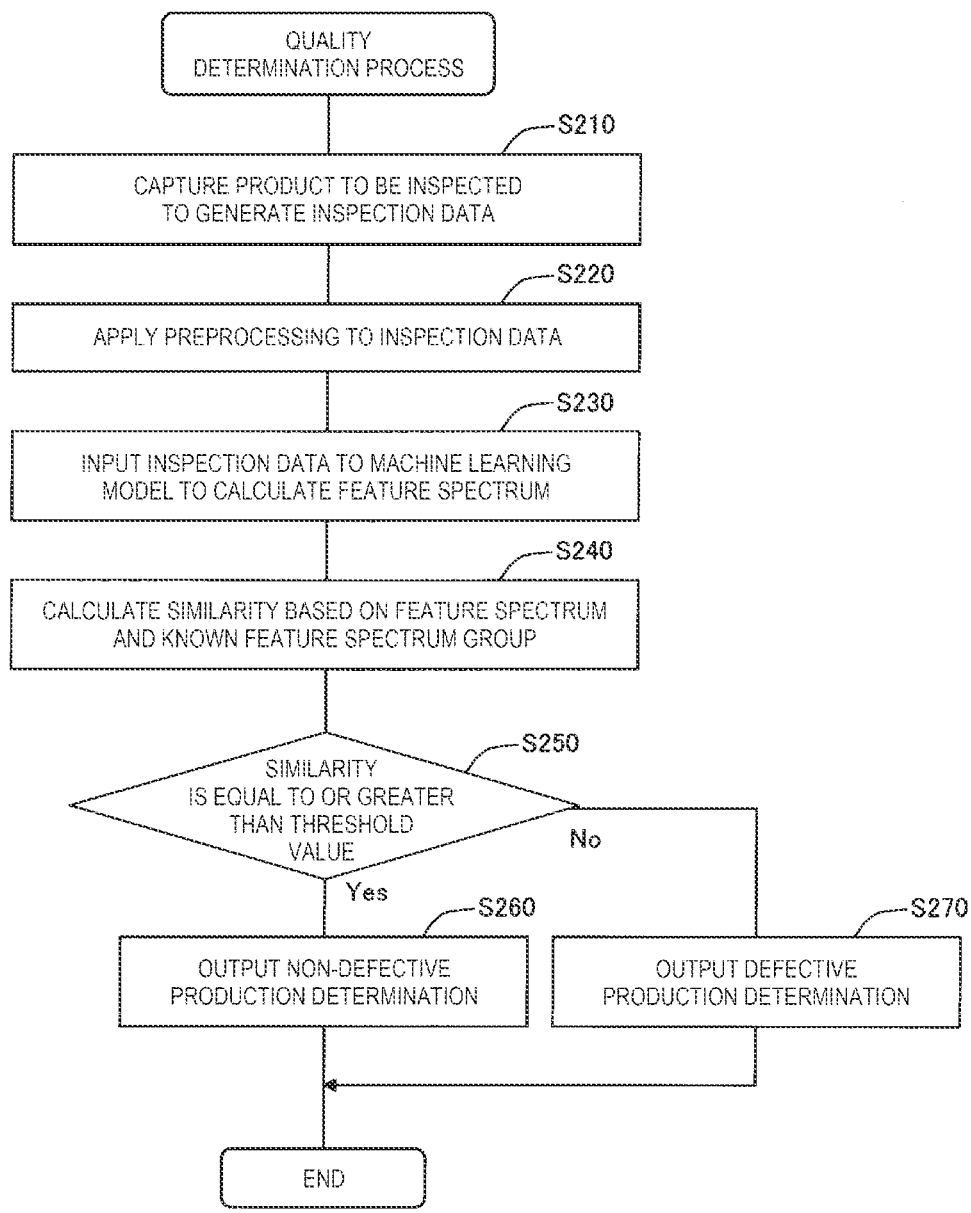
FIG. 8 is a flowchart showing a processing procedure of a quality determination process.

FIG. 8 is a flowchart showing a processing procedure of a quality determination process using the learned machine learning model 200. In step S210, the class determination processing unit 112 obtains inspection data by capturing the image of the product to be inspected by the camera 400. In step S220, the class determination processing unit 112 applies preprocessing to the inspection data. The preprocessing is the same as the preprocessing used in step S120 in FIG. 3. As described with reference to FIG. 4, in the present embodiment, in the preprocessing, the image of the product to be inspected is divided into a plurality of patch images, and each patch image is generated as the inspection data.

In step S230, the class determination processing unit 112 inputs the inspection data to the learned machine learning model 200, and calculates the feature spectrum Sp based on an output of the machine learning model 200. In step S240, the similarity calculation unit 310 calculates the similarity based on the feature spectrum Sp obtained according to the input of the inspection data and the registered known feature spectrum group KSp. When the known feature spectrum group KSp is configured for each class as shown in FIG. 7, the similarity between the known feature spectrum group KSp and the feature spectrum Sp is calculated for each class in step S240. Hereinafter, the similarity is referred to as a "class similarity". On the other hand, when the known feature spectrum group KSp includes the known feature spectra for all the classes without distinguishing the plurality of classes, the similarity between the entire known feature spectrum group KSp and the feature spectrum Sp is calculated in step S240. In the present embodiment, a method using the class similarity will be mainly described.

Figure 9:
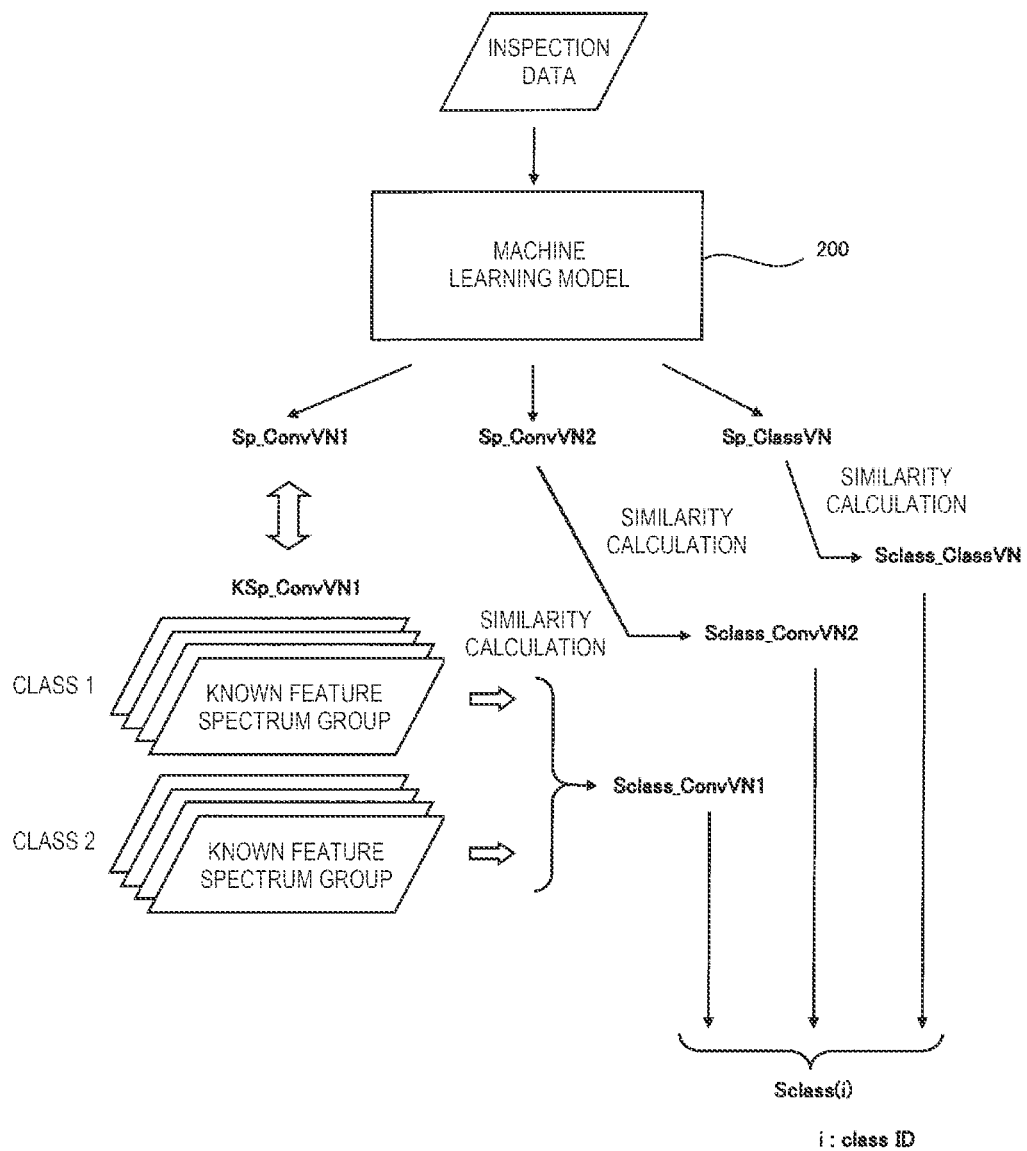
FIG. 9 is a schematic diagram showing a state in which a class similarity related to inspection data is obtained.

FIG. 9 is a schematic diagram showing a state in which a class similarity Sclass related to the inspection data is obtained. When the inspection data is input to the machine learning model 200, the class determination processing unit 112 calculates the feature spectra Sp_ConvVN1, Sp_ConvVN2, and Sp_ClassVN based on the outputs of the ConvVN1 layer 230, the ConvVN2 layer 240, and the ClassVN layer 250 of the machine learning model 200, respectively. The similarity calculation unit 310 calculates a class similarity Sclass_ConvVN1 using the feature spectrum Sp_ConvVN1 and the known feature spectrum group KSp_ConvVN1 that are obtained based on the output of the ConvVN1 layer 230. A specific method for calculating the class similarity will be described later. Similarly, for the ConvVN2 layer 240 and the ClassVN layer 250, class similarities Sclass_ConvVN2 and Sclass_ClassVN are calculated.

Although it is not necessary to generate all of the class similarities Sclass_ConvVN1, Sclass_ConvVN2, and Sclass_ClassVN using the three vector neuron layers 230, 240, and 250, it is preferable to calculate the class similarities using one or more of these vector neuron layers. As described above, in the present disclosure, the vector neuron layer used to calculate the similarity is referred to as a "specific layer".

The similarity calculation unit 310 calculates a final class similarity Sclass(i) using at least one of the class similarities Sclass_ConvVN1, Sclass_ConvVN2, and Sclass_ClassVN. For example, one of the three class similarities Sclass_ConvVN1, Sclass_ConvVN2, and Sclass_ClassVN, which is selected in advance, may be used as the final class similarity Sclass(i). Alternatively, results of appropriate statistical processing of the three class similarities Sclass_ConvVN1, Sclass_ConvVN2, and Sclass_ClassVN may be used as the final class similarity Sclass(i). The "result of appropriate statistical processing" is a statistically representative value. As the statistically representative value, for example, a maximum value, an average value, or a minimum value can be used. Alternatively, a weighted average by a weight determined based on a range of the similarity for each layer can be used. In general, it is preferable to adopt the minimum value among the plurality of class similarities obtained from the plurality of specific layers. The class similarity Sclass(i) is an index indicating a degree to which the inspection data is similar to the training data related to each class i.

In step S250, the quality determination unit 320 determines whether the similarity calculated in step S240 is equal to or greater than a predetermined threshold value. As described above, in the present embodiment, the class similarity Sclass(i) described with reference to FIG. 9 is used as the similarity. In the determination of step S250, one of the following two determination methods can be adopted.

Determination Method J1

When the class similarities Sclass(i) for all the classes are less than the threshold value, the inspection data is determined to be defective, and when the class similarity Sclass(i) for at least one class is equal to or greater than the threshold value, the inspection data is determined to be non-defective.

Determination Method J2

When the class similarity Sclass(i) corresponding to one determination class indicated by the determination values Class 1 and Class 2 of the ClassVN layer 250 is equal to or greater than the threshold value, the inspection data is determined to be non-defective, and when the class similarity Sclass(i) corresponding to the determination class is less than the threshold value, the inspection data is determined to be defective.

In the determination method J1, since the determination is executed for all the classes, the determination can be executed more reliably. In the determination method J2, since it is only necessary to execute the calculation of the class similarity in step S240 for one determination class, the processing can be speeded up.

When it is determined in step S250 that the similarity is equal to or greater than the threshold value, the processing proceeds to step S260, and the inspection data is determined to be non-defective. On the other hand, when it is determined that the similarity is less than the threshold value, the processing proceeds to step S270, and the inspection data is determined to be defective. As described with reference to FIG. 4, when an image of the product to be inspected is divided into a plurality of patch images and it is determined that the similarity is equal to or greater than the threshold value for all of the patch images, the inspection data is determined to be non-defective. When the non-defective product PDa and the defective product PDb as shown in FIG. 4 are respectively inspected as the product to be inspected using the machine learning model 200 according to the present embodiment, the quality of each product can be correctly determined.

As described above, the known feature spectrum group KSp may include the known feature spectra for all classes without distinguishing the plurality of classes. In this case, in step S240, the similarity between the entire known feature spectrum group KSp and the feature spectrum Sp is calculated, and in step S250, the similarity is compared with the threshold value. This method also makes it possible to correctly determine the quality of the inspection data. Since the similarity is calculated without considering the class, the similarity calculation processing is simplified.

As described above, in the present embodiment, since the learning of the machine learning model 200 is executed using, as training data, the plurality of pieces of data of the non-defective products classified into the plurality of classes and the quality determination of the inspection data is executed using the similarity calculated using the learned machine learning model 200 and the known feature spectrum group KSp, the quality determination can be executed without preparing data of defective products as the training data.

B. Method for Calculating Similarity

As a method for calculating the above class similarity, for example, any one of the following four methods can be adopted.

(1) a first calculation method M1 for obtaining the class similarity without considering correspondence between the feature spectrum Sp and the partial region Rn in the known feature spectrum group KSp
(2) a second calculation method M2 for obtaining the class similarity by the corresponding partial regions Rn of the feature spectrum Sp and the known feature spectrum group KSp
(3) a third calculation method M3 for obtaining the class similarity without considering the partial region Rn at all
(4) a fourth calculation method M4 for obtaining the similarity using the known feature spectrum group KSp including known feature spectra for all classes Hereinafter, a method for calculating the similarity based on the output of the ConvVN1 layer 230 according to the four calculation methods M1, M2, M3, and M4 will be sequentially described. In the following descriptions, the parameter q of the inspection data is omitted.

Figure 10:
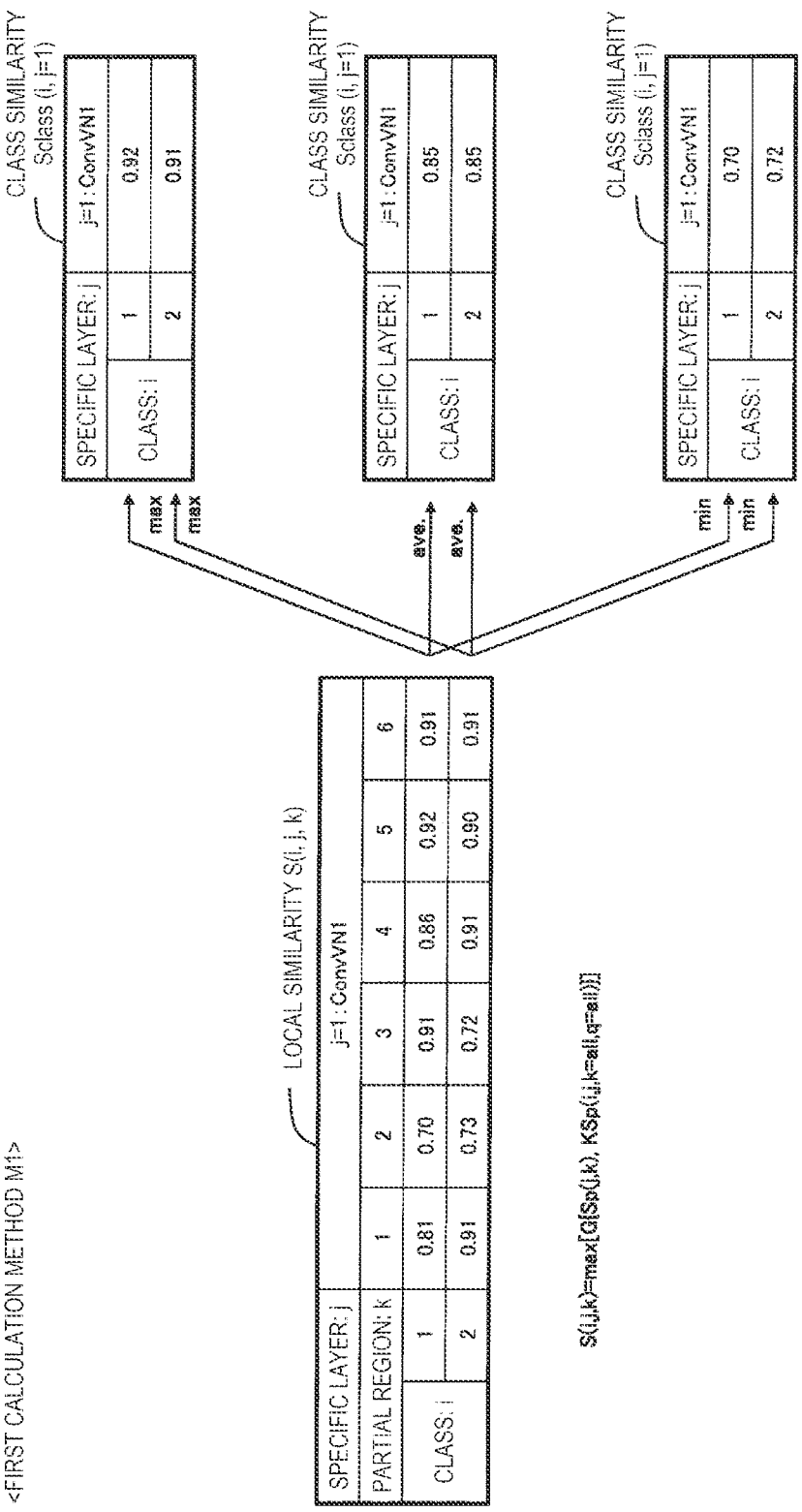
FIG. 10 is a schematic diagram showing a first calculation method of the class similarity.

FIG. 10 is a schematic diagram showing the first calculation method M1 for the class similarity. In the first calculation method M1, first, a local similarity $S(i, j, k)$ indicating the similarity to each class i is calculated for each partial region k based on the output of the ConvVN1 layer 230 that is the specific layer. In FIG. 10, the number of partial regions k is six for simplification of illustration, and in the machine learning model 200 in FIG. 2, k=36. One of the three class similarities $Sclass(i, j)$ shown on the right side of FIG. 10 is calculated based on the local similarities $S(i, j, k)$. The class similarity $Sclass(i, j)$ is the same as the class similarity Sclass_ConvVN1 shown in FIG. 9.

In the first calculation method M1, the local similarity $S(i, j, k)$ is calculated using the following equation.

$$S(i,j,k)=\max[G\{Sp(j,k),KSp(i,j,k=\text{all},q=\text{all})\}] \quad (c1)$$

Here, i is a parameter indicating the class, j is a parameter indicating the specific layer, k is a parameter indicating the partial region Rn, q is a parameter indicating the data number, $G\{a, b\}$ is a function for obtaining the similarity between a and b, $Sp(j, k)$ is the feature spectrum obtained based on the output of the specific partial region k of the specific layer j according to the inspection data, $KSp(i, j, k=\text{all}, q=\text{all})$ is the known feature spectrum of all the data numbers q in all the partial regions k of the specific layer j associated with the class i in the known feature spectrum group KSp shown in FIG. 7, and max[X] is a logical operation that takes the maximum value among the values of X.

As the function $G\{a, b\}$ for obtaining the similarity, for example, an equation for obtaining a cosine similarity or an equation for obtaining the similarity according to the distance can be used.

The three types of class similarities $Sclass(i, j)$ shown on the right side of FIG. 10 are obtained by, for each class i, taking the maximum value, the average value, or the minimum value of the local similarities $S(i, j, k)$ for the plurality of partial regions k. Which calculation of the maximum value, the average value, and the minimum value to be used depends on the purpose of use of the class determination processing, and in general, it is considered that the minimum value is preferably used. However, which of the three types of calculations to be used is experimentally or empirically set in advance by a user.

As described above, in the first calculation method M1 for the class similarity,
  (1) the local similarity $S(i, j, k)$, which is the similarity between the feature spectrum Sp obtained based on the output of the specific partial region k of the specific layer j and all known feature spectra KSp associated with the specific layer j and each class i, is obtained according to the inspection data, and
  (2) the class similarity $Sclass(i, j)$ is obtained, for each class i, by taking the maximum value, the average value, or the minimum value of the local similarities $S(i, j, k)$ for the plurality of partial regions k.

According to the first calculation method M1, the class similarity $Sclass(i, j)$ can be obtained by a relatively simple calculation and procedure.

FIG. 11 is a schematic diagram showing the second calculation method M2 for the class similarity. In the second calculation method M2, the local similarity $S(i, j, k)$ is calculated using the following equation instead of the above equation (c1).

$$S(i,j,k)=\max[G\{Sp(j,k),KSp(i,j,k,q=\text{all})\}] \quad (c2)$$

Here, $KSp(i, j, k, q=\text{all})$ is the known feature spectrum of all the data numbers q in the specific partial region k of the specific layer j associated with the class i in the known feature spectrum group KSp shown in FIG. 7.

In the above first calculation method M1, the known feature spectrum $KSp(i, j, k=\text{all}, q=\text{all})$ in all the partial regions k of the specific layer j is used, whereas in the second calculation method M2, only the known feature spectrum $KSp(i, j, k, q=\text{all})$ for the same partial region k as the partial region k of the feature spectrum $Sp(j, k)$ is used. Other methods in the second calculation method M2 are the same as those in the first calculation method M1.

In the second calculation method M2 for the class similarity,
  (1) the local similarity $S(i, j, k)$, which is the similarity between the feature spectrum Sp obtained based on the output of the specific partial region k of the specific layer j and all known feature spectra KSp associated with the specific partial region k of the specific layer j and each class i, is obtained according to the inspection data, and
  (2) the class similarity $Sclass(i, j)$ is obtained, for each class i, by taking the maximum value, the average value, or the minimum value of the local similarities $S(i, j, k)$ for the plurality of partial regions k.

According to the second calculation method M2, the class similarity $Sclass(i, j)$ can also be obtained by a relatively simple calculation and procedure.

FIG. 12 is a schematic diagram showing the third calculation method M3 for the class similarity. In the third calculation method M3, the class similarity $Sclass(i, j)$ is calculated based on the output of the ConvVN1 layer 230, which is the specific layer, without obtaining the local similarity $S(i, j, k)$.

The class similarity $Sclass(i, j)$ obtained by the third calculation method M3 is calculated using the following equation.

$$Sclass(i,j)=\max[G\{Sp(j,k=\text{all}),KSp(i,j,k=\text{all},q=\text{all})\}] \quad (c3)$$

Here, $Sp(j, k=\text{all})$ is the feature spectrum obtained based on the outputs of all the partial regions k of the specific layer j according to the inspection data.

As described above, in the third calculation method M3 for the class similarity,
  (1) the class similarity $Sclass(i, j)$, which is the similarity between all the feature spectra Sp obtained based on the output of the specific layer j according to the inspection data and all the known feature spectra KSp associated with the specific layer j and each class i, is obtained for each class.

According to the third calculation method M3, the class similarity $Sclass(i, j)$ can be obtained by a simpler calculation and procedure.

Each of the three calculation methods M1 to M3 described above is a method for calculating the class similarity for each specific layer i. As described above, in the present embodiment, the class similarity can be calculated using one or more of the plurality of vector neuron layers 230, 240, and 250 shown in FIG. 2 as the specific layer. When a plurality of specific layers are used, for example, it is preferable to use the minimum value among the plurality of class similarities obtained based on the plurality of specific layers as the final similarity.

In the fourth calculation method M4, the similarity with the feature spectrum Sp is calculated using the known feature spectrum group KSp including the known feature spectra for all the classes. A similarity $S\_all(j)$ obtained by the fourth calculation method M4 is calculated using the following equation similar to the above equation (c3).

$$S\_all(j)=\max[G\{Sp(j,k=\text{all}),KSp(i=\text{all},j,k=\text{all},q=\text{all})\}] \quad (c4)$$

Here, Sp(j, k=all) is a feature spectrum obtained based on the outputs of all the partial regions k of the specific layer j according to the inspection data, and KSp(i=all, j, k=all, q=all) is a known feature spectrum of all data numbers q in all partial regions k of the specific layer j with respect to all classes i in the known feature spectrum group KSp shown in FIG. 7.

Also in the fourth calculation method M4, when a plurality of specific layers are used, it is preferable to use the minimum value among the plurality of similarities obtained based on the plurality of specific layers as the final similarity.

C. Calculation Method for Output Vector of Each Layer of Machine Learning Model A method for calculating the output of each layer in the machine learning model 200 shown in FIG. 2 is as follows.

Each node of the PrimeVN layer 220 regards scalar outputs of 1×1×32 nodes of the Conv layer 210 as a 32-dimensional vector, and multiplies the vector by a transformation matrix to obtain a vector output of the nodes. The transformation matrix is an element of a kernel having a surface size of 1×1, and is updated by the learning of the machine learning model 200. The processing of the Conv layer 210 and the PrimeVN layer 220 may be integrated to form one prime vector neuron layer.

When the PrimeVN layer 220 is referred to as a "lower layer L" and the ConvVN1 layer 230 adjacent to the upper side of the PrimeVN layer 220 is referred to as an "upper layer L+1", the output of each node of the upper layer L+1 is determined using the following equations.

$$v_{ij} = W^L_{ij} M^L_i \quad (E1)$$

$$u_j = \sum_i v_{ij} \quad (E2)$$

$$a_j = F(\|u_j\|) \quad (E3)$$

$$M^{L+1}_j = a_j \times \frac{1}{\|u_j\|} u_j \quad (E4)$$

Here, $M^L_i$ is an output vector of an i-th node in the lower layer L, $M^{L+1}_j$ is an output vector of a j-th node in the upper layer L+1, $v_{ij}$ is a prediction vector of the output vector $M^{L+1}_j$, $W^L_{ij}$ is a prediction matrix for calculating the prediction vector $v_{ij}$ based on the output vector $M^L_i$ of the lower layer L, $u_j$ is a sum vector that is a sum of the prediction vectors $v_{ij}$, that is, a linear combination, $a_j$ is an activation value that is a normalization coefficient obtained by normalizing the norm $|u_j|$ of the sum vector $u_j$, and F(X) is a normalization function that normalizes X.

As the normalization function F(X), for example, the following equation (E3a) or (E3b) can be used.

$$a_j = F(\|u_j\|) = \mathit{softmax}(\|u_j\|) = \frac{\exp(\beta\|u_j\|)}{\sum_k \exp(\beta\|u_k\|)} \quad (E3a)$$

$$a_j = F(\|u_j\|) = \frac{\|u_j\|}{\sum_k \|u_k\|} \quad (E3b)$$

Here, k is an ordinal number for all nodes of the upper layer L+1, and β is an adjustment parameter that is any positive coefficient, and for example, β=1.

In the above equation (E3a), the activation value $a_j$ is obtained by normalizing the norm $|u_j|$ of the sum vector $u_j$ for all nodes of the upper layer L+1 by the softmax function. On the other hand, in the equation (E3b), the activation value $a_j$ is obtained by dividing the norm $|u_j|$ of the sum vector $u_j$ by the sum of the norms $|u_j|$ of all the nodes of the upper layer L+1. As the normalization function F(X), a function other than the equation (E3a) and the equation (E3b) may be used.

For convenience, the ordinal number i of the above equation (E2) is assigned to the nodes of the lower layer L used for determining the output vector $M^{L+1}_j$ of the j-th node in the upper layer L+1, and takes values of 1 to n. The integer n is the number of nodes in the lower layer L used to determine the output vector $M^{L+1}_j$ of the j-th node in the upper layer L+1. Therefore, the integer n is given by the following equation.

$$n = Nk \times Nc \quad (E5)$$

Here, Nk is the surface size of the kernel, and Nc is the number of channels of the PrimeVN layer 220 that is the lower layer. In the example in FIG. 2, since Nk=9 and Nc=16, n=144.

One kernel used to obtain the output vector of the ConvVN1 layer 230 has 3×3×16=144 elements in which the kernel size is 3×3 as the surface size and the number of channels of the lower layer is 16 as the depth, and each of these elements is the prediction matrix $W^L_{ij}$. In order to generate the output vectors of 12 channels of the ConvVN1 layer 230, 12 sets of kernels are required. Therefore, the number of the prediction matrices $W^L_{ij}$ of the kernel used to obtain the output vector of the ConvVN1 layer 230 is 144×12=1728. These prediction matrices $W^L_{ij}$ are updated by the learning of the machine learning model 200.

As is clear from the above equations (E1) to (E4), the output vector $M^{L+1}_j$ of each node of the upper layer L+1 is obtained by the following calculation:
 (a) the output vector $M^L_i$ of each node of the lower layer L is multiplied by the prediction matrix $W^L_{ij}$ to obtain the prediction vector $v_{ij}$,
 (b) the sum vector $u_j$, which is the sum of the prediction vectors $v_{ij}$ obtained from the nodes of the lower layer L, that is, the linear combination, is obtained,
 (c) the activation value $a_j$, which is the normalization coefficient, is obtained by normalizing the norm $|u_j|$ of the sum vector $u_j$, and
 (d) the sum vector $u_j$ is divided by the norm $|u_j|$, and further multiplied by the activation value $a_j$.

The activation value $a_j$ is a normalization coefficient obtained by normalizing the norm $|u_j|$ for all nodes of the upper layer L+1. Therefore, the activation value a can be considered as an index indicating a relative output intensity of each node among all nodes in the upper layer L+1. The norm used in the equations (E3), (E3a), (E3b), and (4) is an L2 norm representing a vector length in a typical example. At this time, the activation value $a_j$ corresponds to the vector length of the output vector $M^{L+1}_j$. Since the activation value $a_j$ is merely used in the above equations (E3) and (E4), it is not necessary to output the activation value $a_j$ from the node. Alternatively, the upper layer L+1 can output the activation value $a_j$ to the outside.

A configuration of a vector neural network is substantially the same as a configuration of a capsule network, and vector neurons of the vector neural network correspond to capsules of the capsule network. However, calculation according to the above equations (E1) to (E4) used in the vector neural network is different from calculation used in the capsule network. The largest difference between the two calculations is that, in the capsule network, the prediction vector $v_{ij}$ on the right side of the above equation (E2) is multiplied by a weight, and the weight is searched by repeating dynamic routing a plurality of times. On the other hand, in the vector neural network according to the present embodiment, the output vector $M^{L+1}{}_j$ is obtained by sequentially calculating the above equations (E1) to (E4) once. Therefore, there is an advantage that it is not necessary to repeat the dynamic routing and the calculation is executed at a higher speed. The vector neural network according to the present embodiment has an advantage that, the memory amount required for the calculation is smaller than that of the capsule network, and according to the experiment of the inventor of the present disclosure, the memory amount of the vector neural network is only approximately ½ to ⅓ of that of the capsule network.

The vector neural network is the same as the capsule network in that a node that inputs and outputs a vector is used. Therefore, the advantage of using vector neurons is also common to the capsule network. The plurality of layers 210 to 250 are the same as a normal convolutional neural network in that, the higher the level, the larger the feature of the region, and the lower the level, the smaller the feature of the region. Here, the "feature" means a characteristic portion included in input data to the neural network. The vector neural network or the capsule network is superior to the normal convolutional neural network in that the output vector of a certain node includes spatial information representing spatial information on a feature represented by the node. That is, the vector length of the output vector of a certain node represents a presence probability of the feature represented by the node, and a vector direction represents the spatial information such as the direction and the scale of the feature. Therefore, the vector directions of the output vectors of two nodes belonging to the same layer represent positional relation of the features. Alternatively, it can be said that the vector directions of the output vectors of the two nodes represent variations of features. For example, in the case of a node corresponding to the feature of "eye", the direction of the output vector may represent variations such as the fineness and the lifting manner of the eye. In the normal convolutional neural network, it is said that spatial information on a feature is lost due to pooling processing. As a result, the vector neural network and the capsule network have an advantage that the performance of identifying input data is superior to that of the normal convolutional neural network.

The advantage of the vector neural network can also be considered as follows. That is, the vector neural network has an advantage in that an output vector of a node expresses a feature of input data as coordinates in a continuous space. Therefore, the output vector can be evaluated such that the features are similar if the vector directions are close. There is also an advantage that, for example, even when the feature included in the input data is not covered by the training data, the feature can be determined by interpolation. On the other hand, the normal convolutional neural network has a disadvantage that, disorderly compression is applied due to the pooling processing, and thus a feature of input data cannot be expressed as coordinates in a continuous space.

The outputs of the nodes of the ConvVN2 layer 240 and the ClassVN layer 250 are also determined in the same manner using the above equations (E1) to (E4). Therefore, detailed descriptions thereof will be omitted. The resolution of the ClassVN layer 250, which is the uppermost layer, is 1×1, and the number of channels is Nm.

The output of the ClassVN layer 250 is converted into a plurality of determination values Class 0 to Class 2 for a known class. These determination values are normally values normalized by the softmax function. Specifically, for example, the calculation is executed, that is, the vector length of the output vector is calculated based on the output vector of each node of the ClassVN layer 250, and the vector length of each node is normalized by the softmax function, thereby obtaining a determination value for each class. As described above, the activation value a obtained by the above equation (E3) is a value corresponding to the vector length of the output vector $M^{L+1}{}_j$, and is normalized. Therefore, the activation value $a_j$ in each node of the ClassVN layer 250 may be output and used as it is as a determination value for each class.

In the above embodiment, as the machine learning model 200, the vector neural network that obtains the output vector by the calculation of the above equations (E1) to (E4) is used. Alternatively, instead of the vector neural network, a capsule network disclosed in U.S. Pat. No. 5,210,798 or International Publication No. 2009/083553 may be used.

Other Embodiments

The present disclosure is not limited to the above embodiment, and can be implemented in various forms without departing from the spirit of the present disclosure. For example, the present disclosure can also be implemented by the following aspects. Technical features in the above embodiment corresponding to technical features in the embodiments described below can be appropriately replaced or combined in order to solve a part or all of the problems of the present disclosure or in order to achieve a part or all of the effects of the present disclosure. Any of the technical features can be appropriately deleted unless the technical feature is described as essential herein.

(1) A first aspect of the present disclosure provides a method for determining quality of inspection data using a machine learning model of a vector neural network type including a plurality of vector neuron layers. This method includes: (a) generating a plurality of pieces of training data by classifying a plurality of pieces of data of a non-defective product into a plurality of classes and assigning a plurality of labels distinguishing the plurality of classes to the plurality of pieces of data of the non-defective product; (b) executing learning of the machine learning model using the plurality of pieces of training data; (c) preparing a known feature spectrum group obtained based on an output of at least one specific layer among the plurality of vector neuron layers when the plurality of pieces of training data are input to the learned machine learning model; and (d) executing quality determination processing of the inspection data using the learned machine learning model and the known feature spectrum group. The (d) includes (d1) calculating a feature spectrum based on the output of the specific layer in response to an input of the inspection data to the machine learning model, (d2) calculating a similarity between the feature spectrum and the known feature spectrum group, and (d3) determining the inspection data to be non-defective when the similarity is equal to or greater than a preset threshold value, and determining the inspection data to be defective when the similarity is less than the threshold value.

According to this method, since the learning of the machine learning model is executed using, as the training data, the plurality of pieces of data of the non-defective product classified into the plurality of classes and the quality determination of the inspection data is executed using the similarity calculated using the learned machine learning model and the known feature spectrum group, the quality determination can be executed without preparing data of a defective product as the training data.

(2) In the above method, the (c) may include preparing the known feature spectrum group for each of the plurality of classes, the similarity calculated in the (d2) may be a class-based similarity between the feature spectrum and the known feature spectrum group related to a respective one of the plurality of classes, and in the (d3), the inspection data may be determined to be defective when the similarity related to all of the plurality of classes is less than the preset threshold value, and the inspection data may be determined to be non-defective when the similarity related to at least one class is equal to or greater than the threshold value.

According to this method, the quality determination can be executed using the class-based similarity.

(3) In the above method, the (c) may include preparing the known feature spectrum group for each of the plurality of classes, and the similarity calculated in the (d2) may be a similarity between the feature spectrum and the known feature spectrum group related to a determination class indicated by an output of the machine learning model in response to the inspection data.

According to this method, the quality determination can be executed using the similarity related only to the determination class.

(4) In the above method, the known feature spectrum group may include known feature spectra for all classes without distinguishing the plurality of classes.

According to this method, the similarity can be calculated by a simple calculation.

(5) In the above method, in the specific layer, vector neurons arranged in a plane defined by two axes including a first axis and a second axis may be arranged as a plurality of channels along a third axis in a direction different from the two axes, and in the specific layer, when a region that is specified by a plane position defined by a position of the first axis and a position of the second axis and includes the plurality of channels along the third axis is referred to as partial regions, for each of a plurality of partial regions included in the specific layer, the feature spectrum may be obtained as any one of (i) a first type of feature spectrum in which a plurality of element values of an output vector of each vector neuron included in the corresponding partial region are arranged over the plurality of channels along the third axis, (ii) a second type of feature spectrum obtained by multiplying each element value of the first type of feature spectrum by a normalization coefficient corresponding to a vector length of the output vector, and (iii) a third type of feature spectrum in which the normalization coefficient is arranged over the plurality of channels along the third axis.

According to this method, the similarity can be obtained using any one of the three types of feature spectra obtained based on the output vector of the specific layer.

(6) In the above method, the (d2) may include obtaining a plurality of local similarities that are similarities with respect to the classes related to the plurality of partial regions of the specific layer by obtaining a local similarity that is a similarity between the feature spectrum obtained based on an output of a specific partial region of the specific layer and all known feature spectra associated with the specific layer and the classes in response to the inspection data, and obtaining a class-based similarity that is a similarity on a class basis by obtaining, on a class basis, a maximum value, an average value, or a minimum value of the plurality of local similarities related to the plurality of partial regions.

According to this method, the class similarity can be calculated by a relatively simple calculation.

(7) In the above method, the (d2) may include obtaining a plurality of local similarities that are similarities with respect to the classes related to the plurality of partial regions of the specific layer by obtaining a local similarity that is a similarity between the feature spectrum obtained based on an output of a specific partial region of the specific layer and all known feature spectra associated with the specific partial region of the specific layer and the classes in response to the inspection data, and obtaining a class-based similarity that is a similarity on a class basis by obtaining, on a class basis, a maximum value, an average value, or a minimum value of the plurality of local similarities related to the plurality of partial regions.

According to this method, the class similarity can be calculated by a relatively simple calculation.

(8) In the above method, the (d2) may include obtaining a class-based similarity that is a similarity on a class basis by obtaining, on a class basis, a similarity between all feature spectra obtained based on the output of the specific layer and all known feature spectra associated with the specific layer and each class in response to the inspection data.

According to this method, the class similarity can be calculated by a relatively simple calculation.

(9) A second aspect of the present disclosure provides an information processing apparatus configured to execute quality determination processing for determining quality of inspection data using a machine learning model of a vector neural network type including a plurality of vector neuron layers. The information processing apparatus includes a memory configured to store the machine learning model, and a processor configured to execute a calculation using the machine learning model. The processor is configured to (a) generate a plurality of pieces of training data by classifying a plurality of pieces of data of a non-defective product into a plurality of classes and assigning a plurality of labels distinguishing the plurality of classes to the plurality of pieces of data of the non-defective product, (b) execute learning of the machine learning model using the plurality of pieces of training data, (c) prepare a known feature spectrum group obtained based on an output of at least one specific layer among the plurality of vector neuron layers when the plurality of pieces of training data are input to the learned machine learning model, and (d) execute quality determination processing of the inspection data using the learned machine learning model and the known feature spectrum group. The (d) includes (d1) calculating a feature spectrum based on the output of the specific layer in response to an input of the inspection data to the machine learning model, (d2) calculating a similarity between the feature spectrum and the known feature spectrum group, and (d3) determining the inspection data to be non-defective when the similarity is equal to or greater than a preset threshold value, and determining the inspection data to be defective when the similarity is less than the threshold value.

According to this information processing apparatus, the learning of the machine learning model is executed using, as the training data, the plurality of pieces of data of the non-defective product classified into the plurality of classes, and the quality determination of the inspection data is executed using the similarity calculated using the learned machine learning model and the known feature spectrum group. Therefore, the quality determination can be executed without preparing data of a defective product as the training data.

(10) A third aspect of the present disclosure provides a non-transitory computer readable storage medium storing a computer program configured to execute, by a processor, quality determination processing for determining quality of inspection data using a machine learning model of a vector neural network type including a plurality of vector neuron layers. The computer program includes: (a) generating a plurality of pieces of training data by classifying a plurality of pieces of data of a non-defective product into a plurality of classes and assigning a plurality of labels for distinguishing the plurality of classes to the plurality of pieces of data of the non-defective product; (b) executing learning of the machine learning model using the plurality of pieces of training data; (c) preparing a known feature spectrum group obtained based on an output of at least one specific layer among the plurality of vector neuron layers when the plurality of pieces of training data are input to the learned machine learning model; and (d) executing quality determination processing of the inspection data using the learned machine learning model and the known feature spectrum group. The (d) includes (d1) calculating a feature spectrum based on the output of the specific layer in response to an input of the inspection data to the machine learning model, (d2) calculating a similarity between the feature spectrum and the known feature spectrum group, and (d3) determining the inspection data to be non-defective when the similarity is equal to or greater than a preset threshold value, and determining the inspection data to be defective when the similarity is less than the threshold value.

According to this non-transitory computer readable storage medium storing a computer program, the learning of the machine learning model is executed using, as the training data, the plurality of pieces of data of the non-defective product classified into the plurality of classes, and the quality determination of the inspection data is executed using the similarity calculated using the learned machine learning model and the known feature spectrum group. Therefore, the quality determination can be executed without preparing data of a defective product as the training data.

The present disclosure can also be implemented in various aspects other than the above aspects. For example, the present disclosure can also be implemented in an aspect of a non-transitory computer readable storage medium storing a computer program for implementing functions of a class determination apparatus.

What is claimed is:

1. A method for determining quality of inspection data using a machine learning model of a vector neural network type including a plurality of vector neuron layers, the method comprising:

(a) generating a plurality of pieces of training data by classifying a plurality of pieces of data of a non-defective product into a plurality of classes and assigning a plurality of labels distinguishing the plurality of classes to the plurality of pieces of data of the non-defective product;

(b) executing learning of the machine learning model using the plurality of pieces of training data;

(c) preparing a known feature spectrum group obtained based on an output of at least one specific layer among the plurality of vector neuron layers when the plurality of pieces of training data are input to the learned machine learning model; and (d) executing quality determination processing of the inspection data using the learned machine learning model and the known feature spectrum group, wherein the (d) includes (d1) calculating a feature spectrum based on the output of the specific layer in response to an input of the inspection data to the machine learning model, (d2) calculating a similarity between the feature spectrum and the known feature spectrum group, and (d3) determining the inspection data to be non-defective when the similarity is equal to or greater than a preset threshold value, and determining the inspection data to be defective when the similarity is less than the preset threshold value.

2. The method according to claim 1, wherein the (c) includes preparing the known feature spectrum group for each of the plurality of classes, the similarity calculated in the (d2) is a class-based similarity between the feature spectrum and the known feature spectrum group related to a respective one of the plurality of classes, and in the (d3), the inspection data is determined to be defective when the similarity related to all of the plurality of classes is less than the preset threshold value, and the inspection data is determined to be non-defective when the similarity related to at least one class is equal to or greater than the preset threshold value.

3. The method according to claim 1, wherein the (c) includes preparing the known feature spectrum group for each of the plurality of classes, and the similarity calculated in the (d2) is a similarity between the feature spectrum and the known feature spectrum group related to a determination class indicated by an output of the machine learning model in response to the inspection data.

4. The method according to claim 1, wherein the known feature spectrum group includes known feature spectra for all classes without distinguishing the plurality of classes.

5. The method according to claim 1, wherein in the specific layer, vector neurons arranged in a plane defined by two axes including a first axis and a second axis are arranged as a plurality of channels along a third axis in a direction different from the two axes, and in the specific layer, when a region that is specified by a plane position defined by a position of the first axis and a position of the second axis and includes the plurality of channels along the third axis is referred to as a partial region, for each of a plurality of partial regions included in the specific layer, the feature spectrum is obtained as one of (i) a first type of feature spectrum in which a plurality of element values of an output vector of each vector neuron included in the corresponding partial region are arranged over the plurality of channels along the third axis,
- (ii) a second type of feature spectrum obtained by multiplying each element value of the first type of feature spectrum by a normalization coefficient corresponding to a vector length of the output vector, and
- (iii) a third type of feature spectrum in which the normalization coefficient is arranged over the plurality of channels along the third axis.

6. The method according to claim 5, wherein the (d2) includes
- obtaining a plurality of local similarities that are similarities with respect to classes related to the plurality of partial regions of the specific layer by obtaining a local similarity that is a similarity between the feature spectrum obtained based on an output of a specific partial region of the specific layer and all known feature spectra associated with the specific layer and classes in response to the inspection data, and
- obtaining a class-based similarity that is a similarity on the class basis by obtaining, on the class basis, a maximum value, an average value, or a minimum value of the plurality of local similarities related to the plurality of partial regions.

7. The method according to claim 5, wherein the (d2) includes
- obtaining a plurality of local similarities that are similarities with respect to classes related to the plurality of partial regions of the specific layer by obtaining a local similarity that is a similarity between the feature spectrum obtained based on an output of a specific partial region of the specific layer and all known feature spectra associated with the specific partial region of the specific layer and classes in response to the inspection data, and
- obtaining a class-based similarity that is a similarity on a class basis by obtaining, on the class basis, a maximum value, an average value, or a minimum value of the plurality of local similarities related to the plurality of partial regions.

8. The method according to claim 5, wherein the (d2) includes
- obtaining a class-based similarity that is a similarity on a class basis by obtaining, on the class basis, a similarity between all feature spectra obtained based on the output of the specific layer and all known feature spectra associated with the specific layer and classes in response to the inspection data.

9. An information processing apparatus configured to execute quality determination processing for determining quality of inspection data using a machine learning model of a vector neural network type including a plurality of vector neuron layers, the information processing apparatus comprising:
- a memory configured to store the machine learning model; and
- a processor configured to execute a calculation using the machine learning model, wherein the processor is configured to
- (a) generate a plurality of pieces of training data by classifying a plurality of pieces of data of a non-defective product into a plurality of classes and assigning a plurality of labels distinguishing the plurality of classes to the plurality of pieces of data of the non-defective product,
- (b) execute learning of the machine learning model using the plurality of pieces of training data,
- (c) prepare a known feature spectrum group obtained based on an output of at least one specific layer among the plurality of vector neuron layers when the plurality of pieces of training data are input to the learned machine learning model, and
- (d) execute quality determination processing of the inspection data using the learned machine learning model and the known feature spectrum group, and the (d) includes
- (d1) calculating a feature spectrum based on the output of the specific layer in response to an input of the inspection data to the machine learning model,
- (d2) calculating a similarity between the feature spectrum and the known feature spectrum group, and
- (d3) determining the inspection data to be non-defective when the similarity is equal to or greater than a preset threshold value, and determining the inspection data to be defective when the similarity is less than the preset threshold value.

10. A non-transitory computer readable storage medium storing a computer program configured to execute, by a processor, quality determination processing for determining quality of inspection data using a machine learning model of a vector neural network type including a plurality of vector neuron layers, the computer program comprising:
- (a) generating a plurality of pieces of training data by classifying a plurality of pieces of data of a non-defective product into a plurality of classes and assigning a plurality of labels distinguishing the plurality of classes to the plurality of pieces of data of the non-defective product;
- (b) executing learning of the machine learning model using the plurality of pieces of training data;
- (c) preparing a known feature spectrum group obtained based on an output of at least one specific layer among the plurality of vector neuron layers when the plurality of pieces of training data are input to the learned machine learning model; and
- (d) executing quality determination processing of the inspection data using the learned machine learning model and the known feature spectrum group, wherein the (d) includes
- (d1) calculating a feature spectrum based on the output of the specific layer in response to an input of the inspection data to the machine learning model,
- (d2) calculating a similarity between the feature spectrum and the known feature spectrum group, and
- (d3) determining the inspection data to be non-defective when the similarity is equal to or greater than a preset threshold value, and determining the inspection data to be defective when the similarity is less than the preset threshold value.

* * * * *